United States Patent
Huang et al.

(10) Patent No.: US 7,480,103 B2
(45) Date of Patent: Jan. 20, 2009

(54) ZOOM LENS CONTROL MECHANISM

(75) Inventors: Yu-Cheng Huang, Jhudong (TW);
Tzu-Chih Lin, Jhudong Township (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 11/831,169

(22) Filed: Jul. 31, 2007

(65) Prior Publication Data

US 2008/0273251 A1 Nov. 6, 2008

(30) Foreign Application Priority Data

May 2, 2007 (TW) .............................. 96115561 A

(51) Int. Cl.
*G02B 15/14* (2006.01)
(52) U.S. Cl. ....................................... 359/696; 359/694
(58) Field of Classification Search .................. 359/696
See application file for complete search history.

(56) References Cited

U.S. PATENT DOCUMENTS

2004/0051967 A1* 3/2004 Nomura ...................... 359/701
2005/0285970 A1* 12/2005 Yamaguchi et al. ......... 348/363

* cited by examiner

*Primary Examiner*—Jordan M. Schwartz
*Assistant Examiner*—James C Jones
(74) *Attorney, Agent, or Firm*—Apex Juris Pllc; Tracy M Heims

(57) ABSTRACT

A zoom lens control mechanism for changing a focal distance in an optical axis of a first lens set includes a zoom lens base, a lens support, and a switch device. The zoom lens base has an image pickup opening disposed in the optical axis of the first lens set. The lens support is disposed on the zoom lens base, with one end rotatably disposed on the zoom lens base, and the other end with a second lens set. Herein, when the lens support rotates, the second lens set shifts between an active position and a leaving position along the surface of the zoom lens base. When the second lens set is at the active position, the focal distance may be changed according to a curvature of the second lens set.

12 Claims, 6 Drawing Sheets

ZOOM LENS CONTROL MECHANISM

CROSS-REFERENCE TO RELATED APPLICATIONS

This non-provisional application claims priority under 35 U.S.C. § 119(a) on Patent Application No(s). 096115561 filed in Taiwan, R.O.C. on May 2, 2007, the entire contents of which are hereby incorporated by reference.

BACKGROUND

1. Field of Invention

The present invention relates to an assembly of an image pickup device, and more particularly to a zoom lens control mechanism.

2. Related Art

Image pickup devices, such as digital video cameras (DVC) and digital cameras (DC), have been widely used. One of the key elements of the image pickup devices is a zoom lens, and an object may be clearly focused on a charge coupled device (CCD) to be imaged by using the optical zoom of the zoom lens.

The zoom lens has multiple lens sets for a zooming purpose, and these lens sets may move relative to each other, so as to move from a focal distance position to another focal distance position. The moving stroke of the lens sets is determined by the optical design of the lenses. Generally, the moving stroke of the lens sets is mechanically controlled a cylindrical groove cam.

Referring to FIGS. 1A and 1B, a conventional zoom lens mechanical control mechanism is shown. The mechanical control mechanism has a lens barrel 110, six groove cams 112 and 114, lens 120 and 130, and a stepping motor 140. The lens barrel 110 is a barrel for holding the whole lens assembly, and is provided with two sets of groove cams 112 and 114 having the same curve and size in its periphery, each set of groove cams has three groove cams, so as to control the lenses 120 and 130 in a system, respectively. The lens barrel 110 has gear teeth 116 around the edge of its bottom, so as to be engaged with driving gears 142 of the stepping motor 140. When a zoom switch is turned on, the stepping motor 140 starts to rotate to drive the lens barrel 110 to rotate. The two lenses 120 and 130 move along the direction of the optical axis along with the movement of cam followers 122 and 132 disposed thereon with respect to the groove cams 112 and 114. Herein, the groove cams require a high accuracy, and are difficult to be manufacture with a high cost, and moreover, the groove cams are also quite difficult to be assembled and adjusted.

Referring to FIG. 2, another conventional zoom lens mechanical control mechanism is shown. The mechanical control mechanism has a first lens set 210 at a foremost position of a zoom lens assembly; a second lens set 220 adjacent to the first lens set 210 and disposed on a lens barrel 230; a threaded bearing 232, formed as a portion of the lens barrel 230; a positioning fork 234, formed on one side of the lens barrel 230 opposite to the threaded bearing 232; a stepping motor 240 having an outer threaded rod 242, which is screwed in a bearing hole of the threaded bearing 232 and engaged with the thread provided on the inner wall of the bearing hole; a third lens set 250, disposed on a lens barrel 260; a threaded bearing 262, formed as a portion of the lens barrel 260; a positioning fork 264, formed on one side of the lens barrel 260 opposite to the threaded bearing 262; and a stepping motor 270 having an outer threaded rod 272, which is screwed in a bearing hole of the threaded bearing 262 and engaged with the thread provided on the inner wall of the bearing hole. These components are all assembled to an assembly base 200. An image sensor 280 is further disposed on the assembly base 200, which is under the backmost element of the lens assembly.

Up to now, the conventional zoom lens mechanical control mechanism realizes zooming adjustment by moving the lens sets along the direction of the optical axis, so as to achieve zooming effect, with a result that the total length or the total size of a zoom lens module is unavoidably increased accordingly.

SUMMARY

In view of the above defects, the present invention is mainly directed to provide a zoom lens control mechanism, so as to achieve zooming effect by transversely rotating and switching the zoom lenses.

Therefore, in order to achieve the aforementioned object, the zoom lens control mechanism provided by the present invention is used to change a focal distance in an optical axis of a first lens set and includes a zoom lens base, a lens support, and a switch device.

The zoom lens base is disposed at one side of the first lens set, and has an image pickup opening disposed in the optical axis of the first lens set.

The lens support is disposed on the zoom lens base, one end thereof is rotatably disposed on the zoom lens base, and the other end is disposed with a second lens set. Herein, when the lens support rotates, the second lens set substantially shifts between an active position and a leaving position along the surface of the zoom lens base. The active position is corresponding to the image pickup opening, and the leaving position is any position deviating from the image pickup opening.

The switch device is used to control the rotation of the lens support substantially in the direction along the surface of the zoom lens base. The switch device and the lens support may be disposed at the same side or the opposite sides of the zoom lens base.

In a similar way, one or more lens supports each having a second lens set are acceptable. The rotation of the lens supports is controlled by one or more switch devices, so as to provide various focal distance changes. Furthermore, the lens sets disposed on the lens supports may have more than one curvature. Herein, the lens supports may be disposed on any surface of the zoom lens base upon actual requirements.

In an embodiment, a first lens support has a following hole disposed at one end opposite to the second lens set. Moreover, a first switch device has an actuator disposed in the following hole. When the first switch device is enabled, the actuator moves transversely, i.e., moves substantially along the surface of the zoom lens base, so as to provide a rotating force to rotate the first lens support. Herein, the following hole is adjacent to the end of the first lens support which is rotatably disposed, such that the actuator may make the first lens support generate a large rotation angle with a slight movement.

In another embodiment, the first lens support has an oblique plane which is at one end thereof opposite to the second lens set. Furthermore, the first switch device has an actuator, and the top of the actuator contacts with the surface of the oblique plane. When the first switch device is enabled, the actuator moves longitudinally, i.e., moves substantially along the direction of the optical axis, and moves up and down with respect to the surface of the zoom lens base, so as to control the rotation of the first lens support. When the top of the actuator moves from the bottom of the oblique plane to the top of the oblique plane, the first lens support is pushed to the image pickup opening.

Furthermore, an elastic part is used to connect the first lens support and the zoom lens base, so as to provide a counter-rotating force. When the top of the actuator moves from the top of the oblique plane to the bottom of the oblique plane, the second lens set on the first lens support may be restored to the leaving position from the active position through the counter-rotating force.

Moreover, the functions of the elastic part and the actuator may be exchanged. When the actuator slides from the bottom of the oblique plane to the top of the oblique plane, the first lens support is rotated to make the other end of the first lens support rotate to deviate from the above portion of the image pickup opening, such that the second lens set is restored to the leaving position. At this point, the elastic part is compressed to generate the rotating force. When the actuator slides from the top of the oblique plane to the bottom of the oblique plane, the first lens support is further pushed to the image pickup opening through the rotating force generated by the elastic part.

In view of the above, according to the zoom lens control mechanism provided by the present invention, the lens sets are transversely moved to achieve the zooming effect, thereby reducing the whole length of the lens sets and further reducing the volume of the applied image pickup device. Furthermore, in the zoom lens control mechanism according to the present invention, a switching and actuating mode similar to a shutter is used, so as to achieve the purposes of simple control and a low cost. Moreover, in the zoom lens control mechanism according to the present invention, multiple lens sets having various curvatures are disposed to provide various focal distance changes when being used together with a master lens (i.e., the first lens set).

The features and practice of the preferred embodiments of the present invention will be illustrated below in detail with reference to the drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1A:
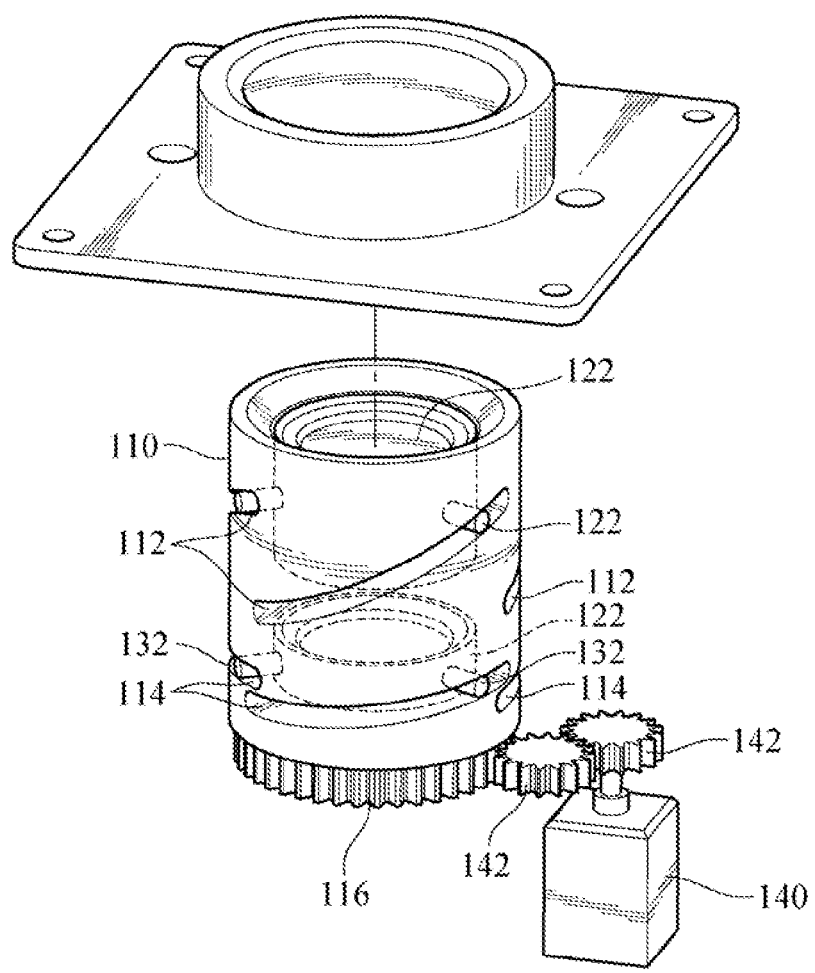
FIG. 1A is a schematic view of a conventional zoom lens mechanical control mechanism.
Figure 1B:
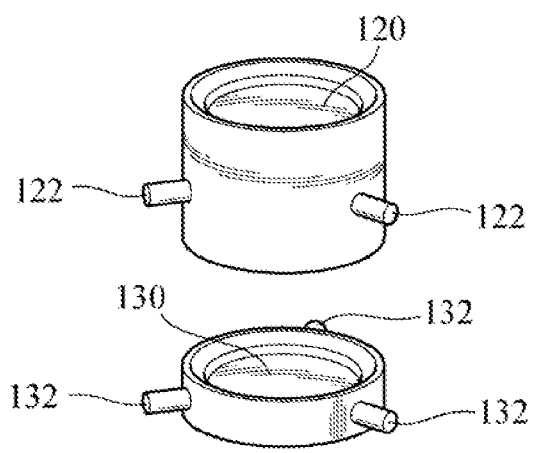
FIG. 1B is a schematic view of the conventional zoom lens mechanical control mechanism.
Figure 2:
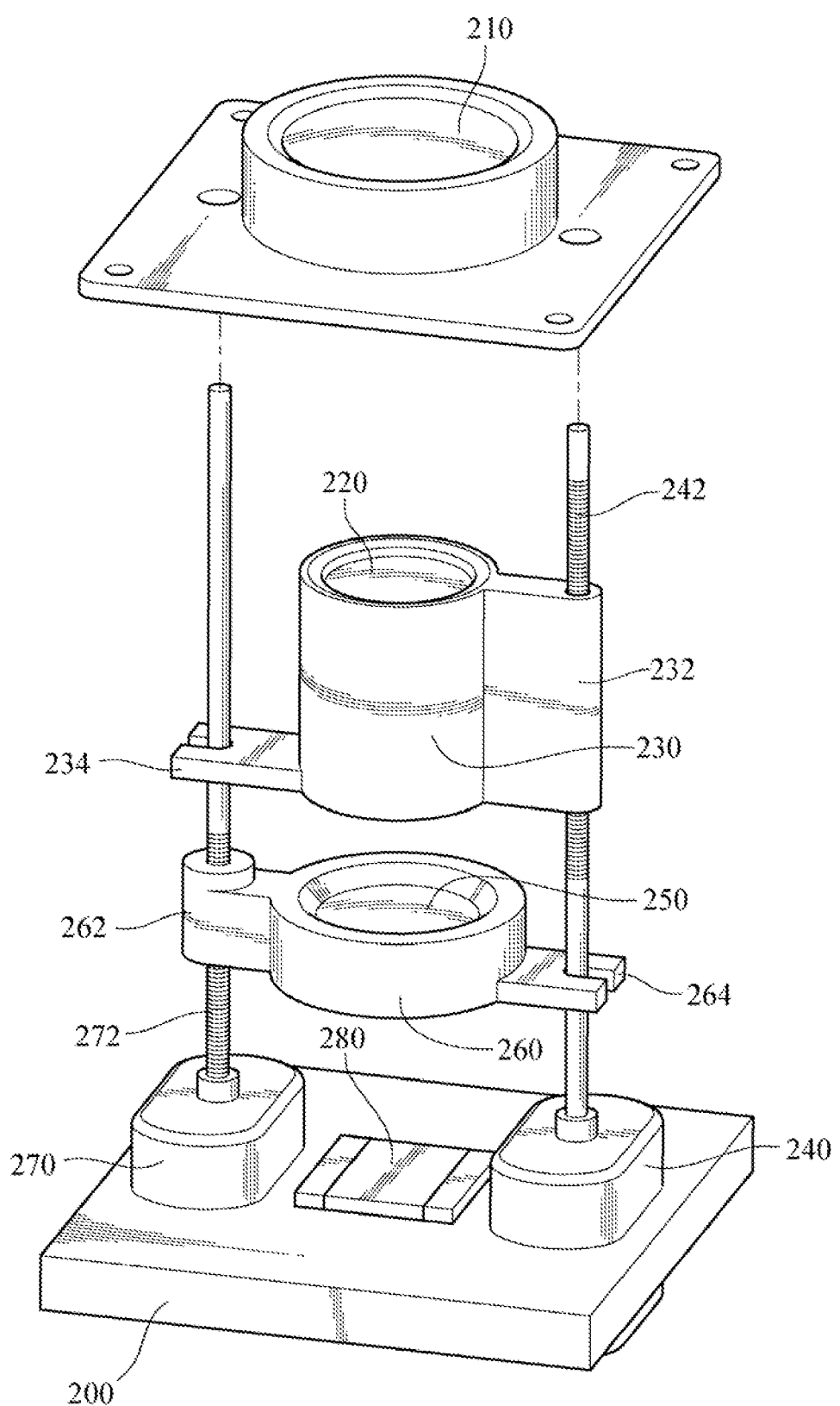
FIG. 2 is a schematic view of another conventional zoom lens mechanical control mechanism.
Figure 3A:
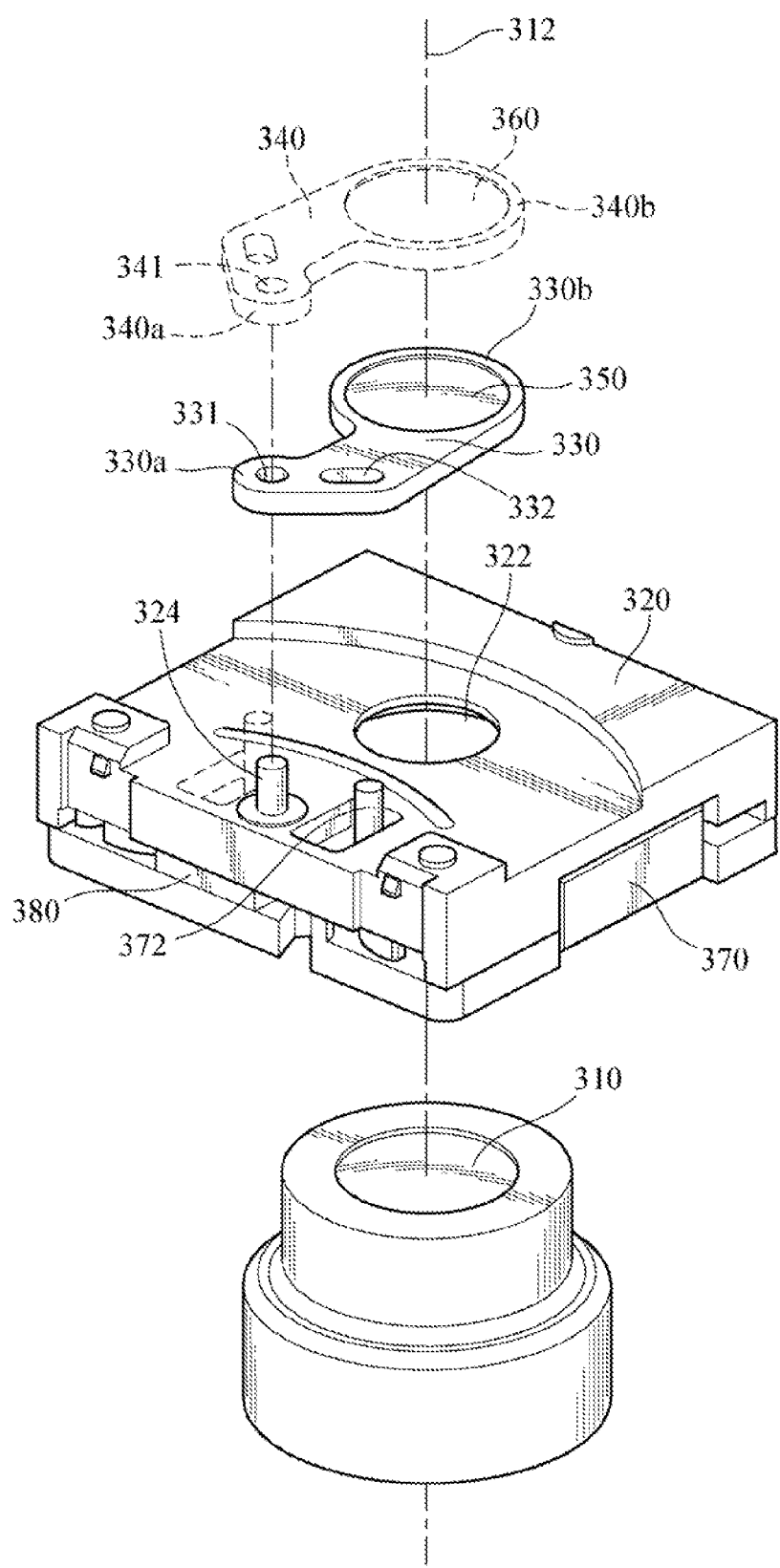
FIG. 3A is a perspective explosive view of the zoom lens control mechanism according to an embodiment of the present invention.
Figure 3B:
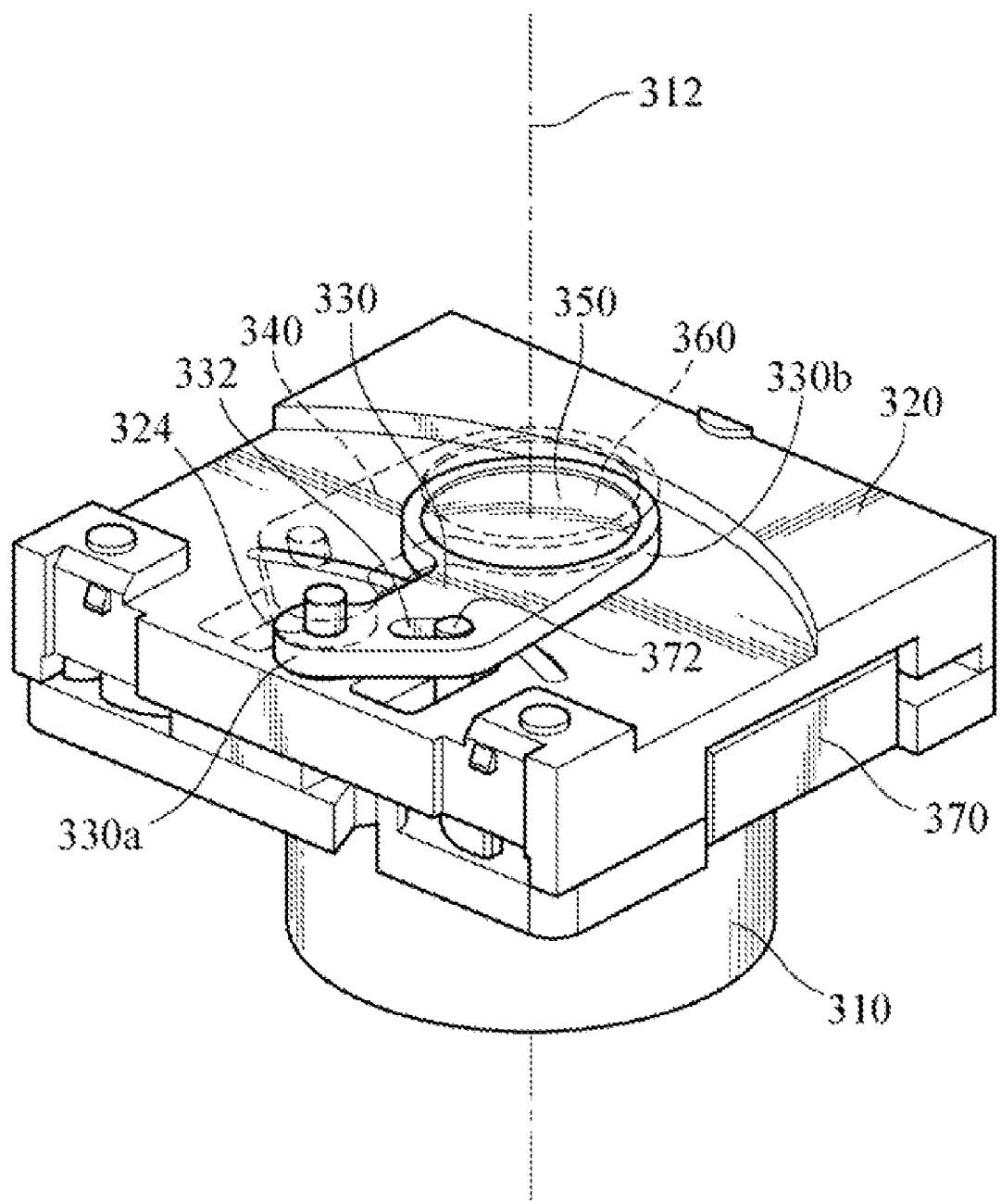
FIG. 3B is a perspective view of the zoom lens control mechanism according to an embodiment of the present invention.

Referring to FIGS. 3A and 3B, a zoom lens control mechanism according to an embodiment of the present invention is shown and used to change a focal distance in an optical axis of a first lens set 310. The zoom lens control mechanism includes a zoom lens base 320, a lens support, and a switch device (referred to as a first lens support 330 and a first switch device 370 hereinafter respectively).

The zoom lens base 320 is disposed at one side of the first lens set 310 and has an image pickup opening 322. The image pickup opening 322 corresponds to the first lens set 310 and is in an optical axis 312 of the first lens set 310.

The first lens support 330 is disposed at one side of the zoom lens base 320 opposite to the first lens set 310, i.e., the first lens support 330 and the first lens set 310 are disposed the upper side and lower side of the zoom lens base 320, respectively. However, the first lens support 330 and the first lens set 310 may also be disposed at the same side of the zoom lens base 320, and the technical theory is substantially the same and will not be stated repeatedly.

Figure 4A:
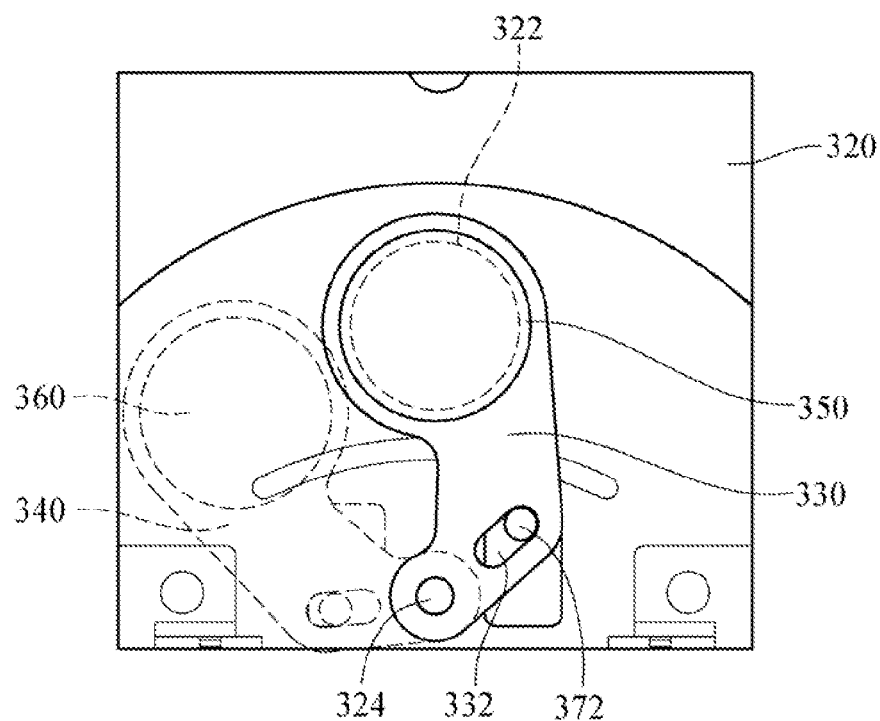
FIG. 4A is a schematic view of an embodiment of a zoom status of the zoom lens control mechanism according to the present invention.
Figure 4B:
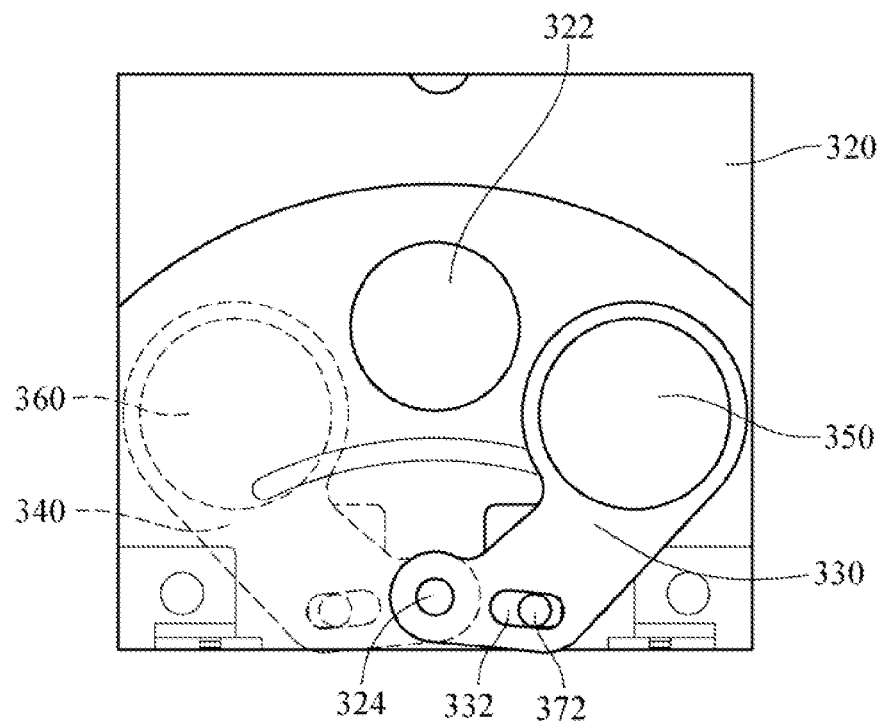
FIG. 4B is a schematic view of another embodiment of a zoom status of the zoom lens control mechanism according to the present invention.

One end 330a of the first lens support 330 is rotatably disposed on the zoom lens base 320, and the other end 330b is disposed with a lens set (referred to as a second lens set 350 hereinafter). For example, a rotation axis 324 is disposed on the zoom lens base 320, a rotation hole 331 is disposed on the end 330a of the first lens support 330, and the rotation hole 331 is rotatably interlocked with the rotation axis 32, i.e., the rotation axis 324 is disposed in the rotation hole 331 of the first lens support 330. Therefore, the second lens set 350 disposed on the other end 330b of the first lens support 330 is rotated on the surface of the zoom lens base 320 between an active position and a leaving position when the first lens support 330 rotates through the rotation axis 324. The active position is in the image pickup opening 322, i.e., in the optical axis 312 of the first lens set 310, and the leaving position deviates from the image pickup opening 322, i.e., at any position deviating from the above portion of the image pickup opening 322. In other words, the second lens set 350 substantially rotates along the surface of the zoom lens base 320 to be above the image pickup opening 322 (i.e., in the optical axis 312 of the first lens set 310), as shown in FIG. 4A, or rotates to deviate from the above portion of the image pickup opening 322, as shown in FIG. 4B.

The first switch device 370 is disposed at one side of the zoom lens base 320 opposite to the second lens set 350, so as to control the rotation of the first lens support 330. In other words, the first switch device 370 provides a rotating force for the first lens support 330, such that the first lens support 330 rotates substantially along the surface of the zoom lens base 320, and the second lens set 350 moves between the active position and the leaving position. However, the first switch device and the second lens set may also be disposed at the same side of the zoom lens base (for example, the first switch device, the second lens set, and the zoom lens base are designed in sequence), and the technical theory is substantially the same and will not be stated repeatedly.

In fact, the zoom lens base 320 and the first switch device 370 may be integrally designed or may be two respective components.

In an embodiment, the first lens support 330 has a following hole 332 disposed at one end of the second lens set 350. Furthermore, the first switch device 370 has an actuator 372 disposed in the following hole 332. In this embodiment, the actuator 372 passes through the zoom lens base 320 and the following hole 332. When the first switch device 370 is enabled, the actuator 372 moves substantially along the direction of the surface of the zoom lens base 320, so as to provide the rotating force to rotate the first lens support 330. In other words, through the movement of the actuator 372, the first lens support 330 is pushed to be above the image pickup opening 322 or to be away from the above of the image pickup opening 322. Herein, the following hole 332 is adjacent to the rotation hole 331, such that the actuator 372 may make the first lens support 330 generate a large rotation angle with a slight movement and rotate between the active position and the leaving position.

Figure 5:
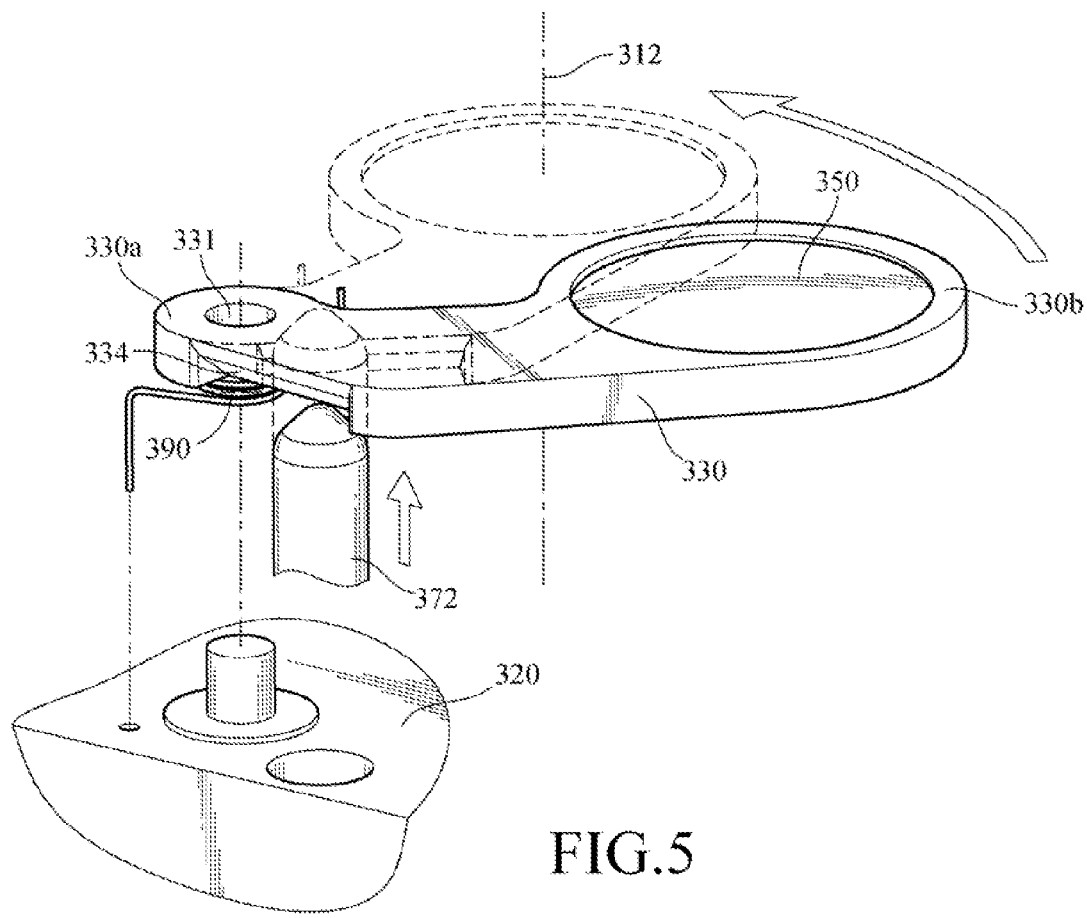
FIG. 5 is a schematic partial view of the zoom lens control mechanism according to another embodiment of the present invention.

In another embodiment, referring to FIG. 5, the first lens support 330 has an oblique plane 334 disposed at one end thereof opposite to the second lens set 350. Furthermore, the first switch device 370 has an actuator 372, and the top of the actuator 372 contacts with the surface of the oblique plane 334. In this embodiment, the actuator 372 passes through the zoom lens base 320 to contact the oblique plane 334. When the first switch device 370 is enabled, the actuator 372 moves substantially along the direction of the optical axis 312, i.e., moves up and down with respect to the surface of the zoom lens base 320, so as to control the rotation of the first lens support 330. In other words, the first lens support 330 is pushed to the image pickup opening 322 when the actuator 372 is pushed upward. Herein, the position of the oblique plane 334 may be determined based on the slope of the oblique plane 334, such that the actuator 372 may make the first lens support 330 rotate between the active position and the leaving position.

Furthermore, an elastic part 390 is used to restore the second lens set 350 on the first lens support 330 from the active position to the leaving position when the top of the actuator 372 moves from the top of the oblique plane 334 to the bottom of the oblique plane 334. Herein, one end of the elastic part 390 is connected to the first lens support 330, and the other end is connected to the zoom lens base 320. Herein, the elastic part 390 is embedded in the first lens support 330 or the zoom lens base 320, or locked on one side of the first lens support 330/the zoom lens base 320. Furthermore, a blocking part is designed on the zoom lens base 320 to fix the other end of the elastic part 390. Although only several setting modes are mentioned the present invention, the present invention is not limited thereby.

In other words, when the actuator 372 moves upward, it will slide from the bottom of the oblique plane 334 to the top of the oblique plane 334. At this time, since one end 330a of the first lens support 330 is rotatably disposed on the zoom lens base 320, the other end 330b of the first lens support 330 generates a rotating force due to the thrust of the actuator 372, and further moves toward the above of the image pickup opening 322 (even if the second lens set 350 moves to the active position). Meanwhile, the elastic part 390 is compressed to generate a counter-rotating force. When the actuator 372 moves downward, it will slide from the top of the oblique plane 334 to the bottom of the oblique plane 334, and at this point, due to the counter-rotating force generated by the elastic part 390, the other end 330b of the first lens support 330 rotates to deviate from the above of the image pickup opening 322, so as to restore the second lens set 350 to the leaving position. The elastic part 390 may be an elastic element, such as a spring.

Moreover, the functions of the elastic part and the actuator may be exchanged, i.e., the elastic part provides a rotating force for the first lens support, while the actuator is used to generate a counter-rotating force. In other words, when the actuator moves from the bottom of the oblique plane to the top of the oblique plane, the first lens support is rotated to rotate the other end of the first lens support to deviate from the above of the image pickup opening, and further restore the second lens set to the leaving position. At this point, the elastic part is compressed to generate a rotating force. When the actuator slides from the top of the oblique plane to the bottom of the oblique plane, the first lens support is further pushed to the image pickup opening due to the rotating force of the elastic part.

In a similar way, another lens support (referred to as a second lens support 340 hereinafter) is further disposed corresponding to the first lens support 330 and disposed at one side of the zoom lens base 320 opposite to the first lens set 310, i.e., the second lens support 340 and the first lens support 330 are disposed at one side of the zoom lens base 320, and the first lens set 310 is disposed at another side of the zoom lens base 320. The second lens support 340 is similar to the first lens support 330 in the design. In an embodiment, the second lens support 340 is symmetric to the first lens support 330.

One end 340a of the second lens support 340 is rotatably disposed on the zoom lens base 320, and the other end 340b is also disposed with another lens set (referred to as a third lens set 360). For example, a rotation hole 341 is further disposed on one end 340a of the second lens support 340, and is rotatably interlocked with the rotation axis 324, i.e., the rotation axis 324 is disposed in the rotation hole 341 of the second lens support 340. Therefore, the third lens set 360 disposed on the second lens support 340 may rotate on the surface of the zoom lens base 320 between an active position and a leaving position when the second lens support 340 rotates through the rotation axis 324, i.e., the third lens set 360 rotates substantially to the above of the image pickup opening 322 along the surface of the zoom lens base 320 (i.e., in the optical axis 312 of the first lens set 310), or rotate to deviate from the image pickup opening 322.

Furthermore, another switch device (referred to as a second switch device 380) is disposed to provide a rotating force for the second lens support 340, such that the second lens support 340 rotates substantially along the direction of the surface of the zoom lens base 320, and the third lens set 360 moves between the active position and the leaving position.

In an embodiment, the first switch device 370 and the second switch device 380 are realized with a single switch device. The first switch device 370 and the second switch device 380 (or a single switch device) are realized with an electromagnetic valve switch or a drive motor.

Figure 6:
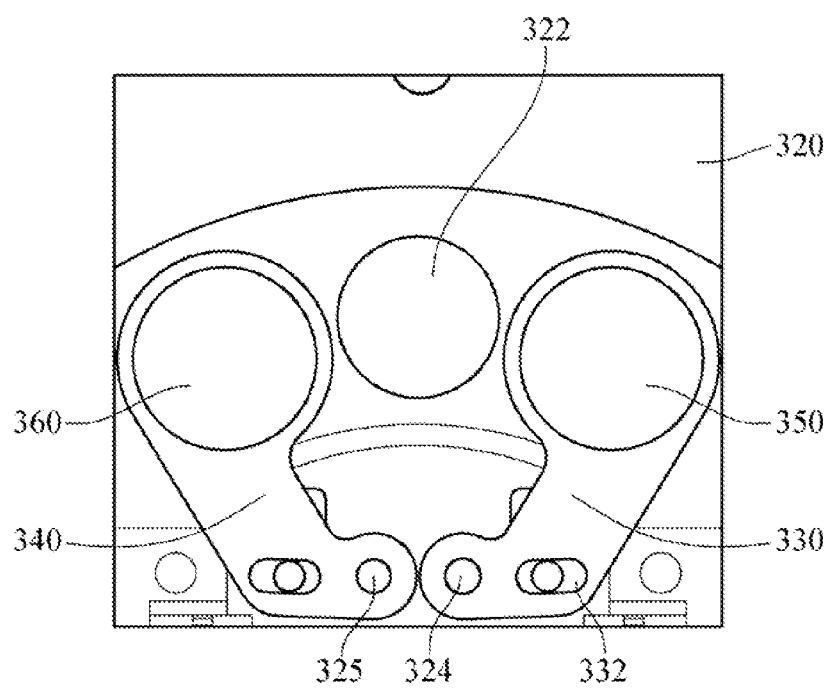
FIG. 6 is a schematic partial view of the zoom lens control mechanism according to another embodiment of the present invention.

Herein, the first lens support 330 and the second lens support 340 not only rotate by using the rotation axis 324, but also rotate through two rotation axes 324 and 325, as shown in FIG. 6.

The second lens set 350 and the third lens set 360 are on the same plane. At this time, the zoom lens control mechanism provides three zoom statuses. The first zoom status is that the second lens set 350 and the third lens set 360 are both at the leaving position; the second zoom status is that the second lens set 350 is at the active position (i.e., in the optical axis 312 of the first lens set 310), and the third lens set 360 is at the leaving position; and the third zoom status is that the second lens set 350 is at the leaving position, and the third lens set 360 is at the active position (i.e., in the optical axis 312 of the first lens set 310).

Furthermore, the second lens set 350 and the third lens set 360 may also be designed to be on different planes. At this point, the zoom lens control mechanism provides four zoom statuses. The first zoom status is that the second lens set 350 and the third lens set 360 are both at the leaving position; the second zoom status is that the second lens set 350 is at the active position (i.e., in the optical axis 312 of the first lens set 310), and the third lens set 360 is at the leaving position; the third zoom status is that the second lens set 350 is at the leaving position, and the third lens set 360 is at the active position (i.e., in the optical axis 312 of the first lens set 310); and the fourth zoom status is that the second lens set 350 and the third lens set 360 are both at the active position (i.e., in the optical axis 312 of the first lens set 310).

Herein, the second lens set 350 and the third lens set 360 may be designed to have different curvatures, so as to achieve various zooming effects. Moreover, each lens set can have one or more lenses.

Furthermore, although it is merely mentioned that one or two lens supports are disposed (to provide the focal distance changes of one or two lens sets), the present invention is not limited thereby, and more than two lens supports may be disposed upon actual requirements, and the lens sets disposed on the lens supports may have more than one curvature. Furthermore, the lens supports may be disposed at any surface of the zoom lens base, and the technical theory is substantially the same as the foregoing and will not be stated repeatedly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens control mechanism, for changing a focal distance in an optical axis of a first lens set, comprising:
   a zoom lens base, disposed at one side of the first lens set and having an image pickup opening, wherein the image pickup opening is in the optical axis of the first lens set;
   a first lens support, one end of the first lens support is rotatably disposed on the zoom lens base and the other end of the first lens support is with a second lens set;
   a first switch device, disposed on the zoom lens base, for controlling the rotation of the first lens support, such that the second lens set shifts between an active position and a leaving position along the surface of the zoom lens base, wherein the active position is corresponding to the image pickup opening, and the leaving position deviates from the image pickup opening;
   a second lens support, one end of the second lens support is rotatably disposed on the zoom lens base and the other end of the second lens support is with a third lens set; and
   a second switch device, for controlling the rotation of the second lens support along the surface of the zoom lens base, such that the third lens set moves between the active position and the leaving position.

2. The zoom lens control mechanism as claimed in claim 1, wherein the first lens support has a following hole disposed at one end thereof opposite to the second lens set; and the first switch device comprises an actuator disposed in the following hole for moving along the direction of the surface of the zoom lens base to provide a rotating force for the first lens support.

3. The zoom lens control mechanism as claimed in claim 1, wherein the first lens support comprises an oblique plane disposed at one end thereof opposite to the second lens set; and the first switch device comprises an actuator for contacting with the oblique plane and moving along the direction of the optical axis, such that the top of the actuator moves between the top and the bottom of the oblique plane.

4. The zoom lens control mechanism as claimed in claim 3, wherein when the top of the actuator moves from the bottom of the oblique plane to the top of the oblique plane, the first lens support is provided with a rotating force through the movement of the actuator provides.

5. The zoom lens control mechanism as claimed in claim 4, further comprising:
   an elastic part, connecting the first lens support and the zoom lens base, for restoring the second lens set on the first lens support from the active position to the leaving position when the top of the actuator moves from the top of the oblique plane to the bottom of the oblique plane.

6. The zoom lens control mechanism as claimed in claim 3, further comprising:
   an elastic part, connecting the first lens support and the zoom lens base, for enabling the first lens support to rotate when the top of the actuator moves from the top of the oblique plane to the bottom of the oblique plane, such that the second lens set shifts from the leaving position to the active position.

7. The zoom lens control mechanism as claimed in claim 1, wherein the second lens set and the third lens set are in the same plane.

8. The zoom lens control mechanism as claimed in claim 1, wherein the second lens set and the third lens set are in different planes.

9. The zoom lens control mechanism as claimed in claim 1, wherein the second lens set and the third lens set have at least one curvature.

10. The zoom lens control mechanism as claimed in claim 1, wherein in a zoom status, the second lens set is at the active position, and the third lens set is at the leaving position.

11. The zoom lens control mechanism as claimed in claim 1, wherein in a zoom status, the second lens set is at the leaving position, and the third lens set is at the leaving position.

12. The zoom lens control mechanism as claimed in claim 1, wherein in a zoom status, the second lens set is at the active position, and the third lens set is at the active position.

* * * * *